United States Patent
Tinholt

(10) Patent No.: US 9,494,245 B1
(45) Date of Patent: Nov. 15, 2016

(54) OVER-MOLDED VALVE STEM AND METHOD OF MAKING A VALVE STEM FOR A VALVE ASSEMBLY

(71) Applicant: Humphrey Products Company, Kalamazoo, MI (US)

(72) Inventor: Thomas H. Tinholt, Galesburg, MI (US)

(73) Assignee: Humphrey Products Company, Kalamazoo, MI (US)

( * ) Notice: Subject to any disclaimer, the term of this patent is extended or adjusted under 35 U.S.C. 154(b) by 48 days.

(21) Appl. No.: 14/212,216

(22) Filed: Mar. 14, 2014

Related U.S. Application Data

(60) Provisional application No. 61/792,837, filed on Mar. 15, 2013.

(51) Int. Cl.
*F16K 27/12* (2006.01)

(52) U.S. Cl.
CPC ..................... *F16K 27/12* (2013.01)

(58) Field of Classification Search
CPC ............................. F15B 13/043; F15B 13/044
USPC ............. 137/625.25–625.27, 625.64–625.66, 137/375
See application file for complete search history.

(56) References Cited

U.S. PATENT DOCUMENTS

| | | | |
|---|---|---|---|
| 2,630,326 A * | 3/1953 | Bryant | F16K 11/07 137/513.5 |
| 3,172,637 A | 3/1965 | Adams et al. | |
| 3,510,103 A | 5/1970 | Carsello | |
| 3,521,851 A | 7/1970 | Sorrow | |
| 4,026,325 A | 5/1977 | Loveless | |
| 4,066,101 A | 1/1978 | de Fries | |
| 4,100,519 A | 7/1978 | Neff | |
| 4,190,081 A * | 2/1980 | Coles | F15B 13/0402 137/624.27 |
| 4,267,862 A | 5/1981 | Neff et al. | |
| 4,271,868 A * | 6/1981 | Neff | F16K 31/408 137/625.6 |
| 4,298,027 A * | 11/1981 | Neff | F15B 13/0431 137/625.65 |
| 4,453,565 A * | 6/1984 | Neff | F15B 13/02 137/596 |
| 4,566,490 A | 1/1986 | Neff | |
| 4,574,844 A | 3/1986 | Neff et al. | |
| 4,823,840 A * | 4/1989 | Kosugi | F16K 11/044 137/625.27 |
| 4,823,842 A | 4/1989 | Toliusis | |
| 4,842,020 A | 6/1989 | Tinholt | |
| 4,915,134 A | 4/1990 | Toliusis et al. | |
| 4,971,115 A | 11/1990 | Tinholt | |

(Continued)

FOREIGN PATENT DOCUMENTS

DE 2321100 4/1973

*Primary Examiner* — Craig Schneider
*Assistant Examiner* — Daniel P Donegan
(74) *Attorney, Agent, or Firm* — Gardner, Linn, Burkhart & Flory, LLP

(57) ABSTRACT

An over-molded valve stem for a valve assembly includes a rigid inner member and a unitary elastic cover molded over the inner member. The inner member includes a main section and an arm extending from the main section. The cover includes a main cover portion, an arm cover portion, and an end portion, with the end portion being spaced from the main cover portion by the arm cover portion. The main cover portion is disposed over the main section with the end portion and main cover portion defining diameters that are larger than the diameter of the arm cover portion. The end portion can include an integral seal member for engaging with a bore of the valve assembly. A method of making the valve stem involves molding the cover about the inner member such that a parting line doe not axially extend across sealing surfaces.

23 Claims, 4 Drawing Sheets

(56) References Cited

U.S. PATENT DOCUMENTS

| | | | | |
|---|---|---|---|---|
| 5,092,365 | A * | 3/1992 | Neff | F16K 31/0627 137/625.27 |
| 5,127,624 | A | 7/1992 | Domke | |
| 5,136,774 | A * | 8/1992 | Neff | F16K 31/0627 137/625.65 |
| 5,211,198 | A | 5/1993 | Tinholt | |
| 5,211,371 | A | 5/1993 | Coffee | |
| 5,518,030 | A * | 5/1996 | Liu | F02M 59/466 137/625.26 |
| 6,105,931 | A | 8/2000 | Frank et al. | |
| 6,405,757 | B1 | 6/2002 | Jabcon | |
| 6,488,050 | B1 | 12/2002 | Jabcon | |
| 6,742,761 | B2 | 6/2004 | Johnson et al. | |
| 7,210,501 | B2 * | 5/2007 | Neff | F16K 11/044 137/625.27 |
| 7,448,411 | B2 | 11/2008 | Friedman et al. | |
| 7,845,370 | B2 * | 12/2010 | Cook | F15B 13/0402 137/625.65 |
| 8,186,978 | B2 | 5/2012 | Tinholt et al. | |
| 8,453,678 | B2 * | 6/2013 | Neff | F16K 11/07 137/625.27 |
| 8,528,597 | B2 | 9/2013 | Friedman et al. | |
| 2002/0178902 | A1 * | 12/2002 | Trzmiel | F15B 13/0402 91/459 |
| 2003/0150498 | A1 * | 8/2003 | Williams | F15B 13/0405 137/625.65 |
| 2003/0213523 | A1 * | 11/2003 | Neff | F16K 31/0613 137/625.65 |
| 2004/0187940 | A1 * | 9/2004 | Manaka | F15B 13/042 137/625.66 |

\* cited by examiner

OVER-MOLDED VALVE STEM AND METHOD OF MAKING A VALVE STEM FOR A VALVE ASSEMBLY

CROSS REFERENCE TO RELATED APPLICATION

The present application claims priority of U.S. provisional application Ser. No. 61/792,837 filed Mar. 15, 2013, which is hereby incorporated herein by reference in its entirety.

BACKGROUND OF THE INVENTION

The present invention is directed to a valve stem and method of making a valve stem, and in particular to an over-molded valve stem for a valve assembly.

Valve stems include sealing surfaces that are used to form seals against the flow of air or fluid by engaging with corresponding surfaces within a valve body. Valve stems may be formed to include a rigid interior component upon which seal rings may be placed, or about which material may be molded to form sealing surfaces. In the case of molded valves it is often necessary to grind the elastomeric material that has been molded thereon to remove parting lines or other irregularities due to the criticality of the seals.

SUMMARY OF THE INVENTION

The present invention provides an over-molded valve stem for a valve assembly. According to an aspect of the present invention a valve assembly comprises a valve body including a valve bore and a sealing edge, and a valve stem disposed in the valve bore. The valve stem comprises an inner member having a main section and an arm extending from the main section, with the main section defining a diameter that is larger than a diameter defined by the arm. An elastic cover is molded over the inner member that includes a main cover portion, an arm cover portion, and an end portion, with the end portion being spaced from the main cover portion by the arm cover portion. The valve stem further includes a seal member distally disposed from the main cover portion. The arm cover portion is disposed over the arm of the inner member and the main cover portion is disposed over the main section with the main cover portion including a sealing surface that operatively engages with the sealing edge to selectively form a seal. The seal member contacts the valve bore to form a seal there against. In particular embodiments the seal member is integrally formed with the end portion, and the valve stem may include a pair of opposed arms with the seal members integrally formed with both associated end portions.

According to another aspect of the present invention, a valve stem comprises a rigid inner member having a main section and one or two arms extending from the main section, with the main section defining a diameter that is larger than a diameter defined by the arms and including one or more sealing surfaces. A unitary elastic cover is molded over the inner member, with the cover including a main cover portion, one or more arm cover portions, and one or more end portions. The end portions and main cover portion of the cover define diameters that are larger than the diameter of the arm cover portions. The end portions may extend axially beyond the length of the arms.

In particular embodiments, the end portions may include a sealing surface that engages with an internal surface of a valve body to form a seal. Alternatively, an insert may be provided that is assembled to the valve stem over which a seal ring may be placed to operate as a sealing surface. An inner member with two opposed arms extending axially relative to the main section, and the cover correspondingly including two arm portions and two end portions, may be used to form a pressure balanced three-way valve stem.

A valve stem in accordance with the present invention may be made by molding a unitary elastic cover over an inner member where the inner member has a main section and an arm extending from the main section with the main section defining a diameter that is larger than a diameter defined by the arm. The mold includes at least two mold parts that engage to define a parting line extending circumferentially about the inner member relative to its longitudinal axis. Accordingly, when molded the elastic cover includes a main cover portion, an arm cover portion, and an end portion, with the main cover portion including a circumferential sealing surface that is formed distally from the parting line.

The valve stem in accordance with the present invention includes a unitary elastic cover having one or more sealing surfaces that engage with corresponding surfaces within a valve body to create seals. In particular embodiments, the sealing surfaces may define poppet seals and dynamic seals, such as for a three-way pressure balanced application. The end portions of the valve stem may be molded to include the dynamic sealing surfaces. The sealing surfaces are formed to be free of parting lines, thereby providing improved sealing without further operations on the sealing surfaces.

These and other objects, advantages, purposes and features of this invention will become apparent upon review of the following specification in conjunction with the drawings.

DESCRIPTION OF THE PREFERRED EMBODIMENTS

Figure 1:
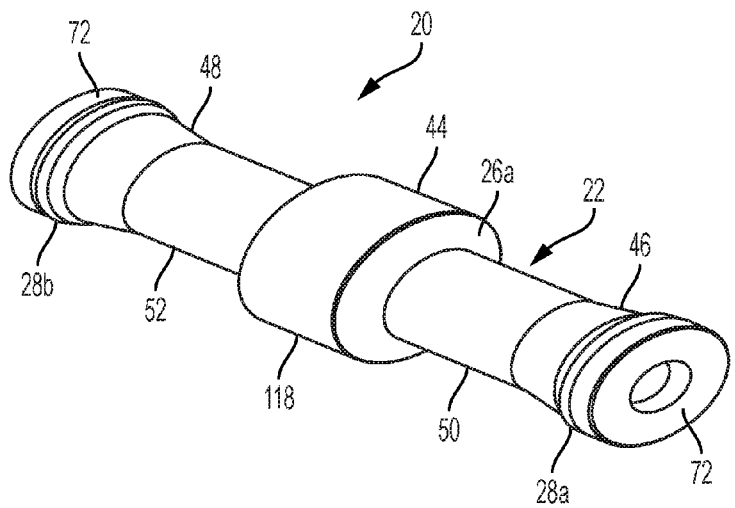
FIG. 1 is a perspective view of an over-molded valve stem of the present invention.

The present invention will now be described with reference to the accompanying figures, wherein the numbered elements in the following written description correspond to like-numbered elements in the figures. An over-molded valve stem in accordance with an embodiment of the present invention is generally shown with reference 20 in FIGS. 1-4. Valve stem 20 includes an elastic, unitary or one-piece exterior member 22 or cover forming a shell disposed over an internal or inner member 24, with valve stem 20 including various circumferential seals or sealing surfaces 26a, 26b, 28a and 28b. When valve stem 20 is engaged with a valve body assembly 30, sealing surfaces 26a, 26b form poppet seals and sealing surfaces 28a, 28b define circumferential seal members that form dynamic seals for pressure balancing. As discussed in more detail below, exterior member 22 is over-molded about inner member 24 such that an axially extending parting line is not formed over sealing surfaces 26a, 26b, 28a and 28b, which would otherwise pose a leakage path risk, whereby no further grinding operation or assembly of additional seals is required.

Inner member 24 comprises a stiff or rigid component that may be constructed of metal, such as brass, or plastic. As shown, inner member 24 includes various grooves 32a-32e formed in the enlarged main, central or poppet section or portion 34, where the grooves 32 are circumferential and aid in promoting a mechanical interlock of exterior member 22 to inner member 24. The grooves 32 are defined by radial extending, circumferentially disposed projections of the inner member 24. Inner member 24 further includes a pair of axially extending or projecting portions or arms 36, 38 that extend in opposed directions from enlarged section 34. Arms 36, 38 are cylindrical and hollow and include internal seats 40, 42, respectively. Central section 34 defines an outside diameter 35 (FIG. 4) that is larger than the outside diameter 39 (FIG. 4) of arms 36, 38.

Exterior member 22 comprises an axially molded, pliable rubber member and includes a main or poppet section or portion 44 that includes sealing surfaces 26a, 26b. As understood from FIG. 2, sealing surfaces 26a, 26b are circumferential surfaces that are angled relative to the central cylindrical section of portion 44 located between surfaces 26a, 26b. Exterior member 22 further includes a pair of opposed trumpet shaped ends or end sections or portions 46, 48, with each end section 46, 48 including a respective seal member or sealing surface 28a, 28b. End sections 46, 48 are separated from and connected to poppet section 44 by extending portions or arm portions 50, 52 that are disposed over arms 36, 38, respectively, of inner member 24. End sections 46, 48, thus, extend axially beyond the ends of arms 36, 38 and terminate at ends 47, 49 (FIG. 4), respectively. Arm portions 50, 52 are generally cylindrical in form with each having a wall thickness 54, 56, respectively, that is thinner than the thickness of the end sections 46, 48 at 58, 60 and relative to the wall thickness 62, 64 at the sealing surfaces 28a, 28b. Accordingly, as shown, end sections 46, 48, and in particular, sealing members 28a, 28b extend radially outward further than arm portions 50, 52 relative to the longitudinal axis 66 of valve stem 20. In addition to having thicker walls in the illustrated embodiment, end sections 46, 48 are further shown to be molded so as to be radially outwardly flared. That is, they include a portion having a larger inside diameter at 68, 70 relative to the inside diameter of arm portions 50, 52. The molded exterior member 22 thus defines an outside diameter 45 at main section 44, an outside diameter 53 at arm portions 50, 52, and an outside diameter 65 at sealing surfaces 28a, 28b, where diameters 45 and 65 are greater than diameter 53. As shown, sealing surfaces 28a, 28b are formed by protruding lips or bulges in end portions 46, 48.

Figure 3:
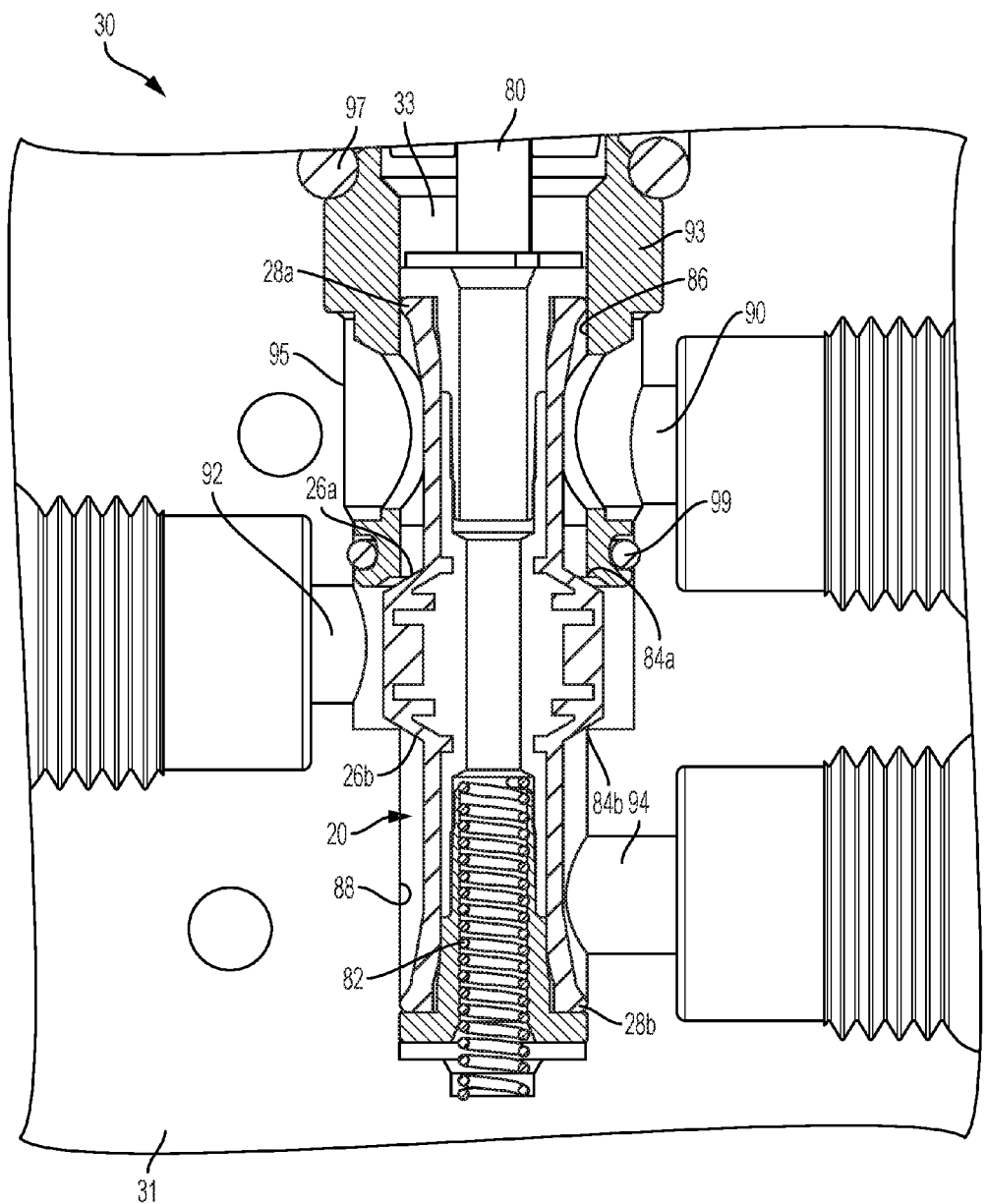
FIG. 3 is a cross-sectional side elevation view showing the valve stem of FIG. 1 operatively installed within a valve body.
Figure 4:
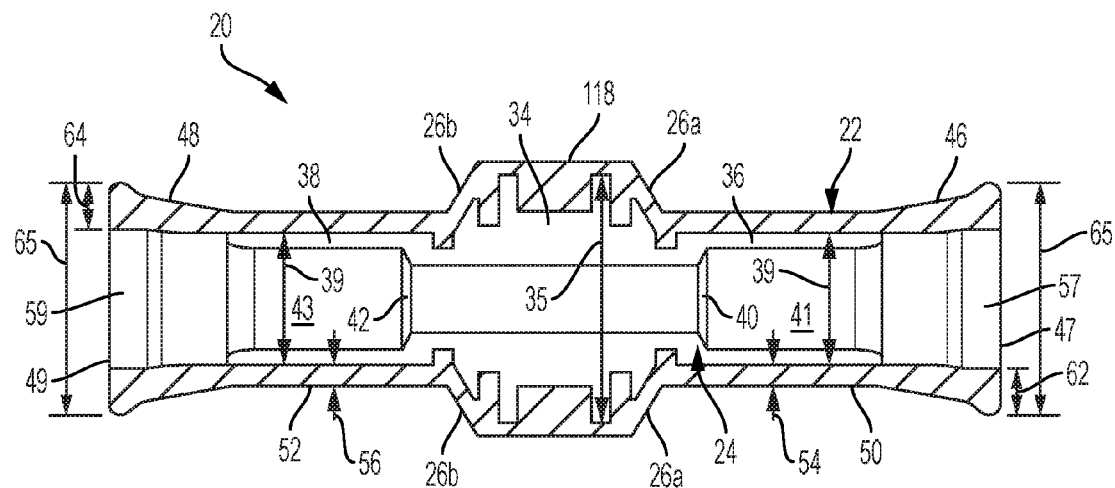
FIG. 4 is a cross-sectional side elevation view of the valve stem of FIG. 1 shown without end inserts.

Referring now to FIG. 3, valve stem 20 is shown operatively installed within a valve body assembly 30, where assembly 30 includes a valve body 31 having a valve bore 33 within which valve stem 20 is disposed. In the embodiment shown, valve stem 20 is actuated, such as by a solenoid 80 or other actuator force, to push valve stem 20 downward to open the flow path. A biasing member, shown as spring 82, normally biases valve stem 20 upward. Sealing surfaces 26a, 26b mate with circumferential sealing edges 84a, 84b of valve body assembly 30 to thereby form poppet seals. In the illustrated embodiment, as understood from FIG. 3, the poppet seals engage sealing surfaces 26a, 26b at a diameter that is approximately equivalent to the diameter of sealing surfaces 28a, 28b engaging with cylindrical bores 86, 88, respectively, of valve body assembly 30 to form a pressure balanced valve stem 20. That is, the diameter of the cylindrical bores 86, 88 and the corresponding outer diameter of the sealing surfaces 28a, 28b is approximately equal to the diameter of the circumferential sealing edges 84a, 84b at which point sealing surfaces 26a, 26b engage with body 31. Thus, in the illustrated embodiment, valve stem 20 and valve body assembly 30 form a three-way pressure balanced valve system having a pressurized fluid inlet port 90, a fluid delivery port 92, such as to provide pressurized fluid to a cylinder or other device, and a fluid exhaust port 94. It should be appreciated that the diameter of sealing surfaces 28a, 28b will be slightly larger than the diameter of bores 86, 88 prior to installation, but will compress down upon installation to provide sealing engagement with the bore 33. In addition, the noted diameters and sealing edges can be adjusted to provide pressure adjustment optimization. For example, the diameter of one or both of the sealing surfaces 28a, 28b and corresponding bores 86, 88 can be smaller than the diameter of the circumferential sealing edges 84a, 84b to provide an imbalance for biasing, such as to counter forces of a spring or the like.

As also shown in the illustrated embodiment, a valve bore insert 93 is installed into bore 95 of valve body 31 by location on shoulders of body 31, where insert 93 defines a portion of valve bore 33. In particular, insert 93 includes cylindrical bore 86 and includes an opening that is aligned with port 90 when installed. A pair of seal rings 97 and 99 are used to seal against bore 95 to prevent fluid, such as gas or liquid, from passing beyond seal rings 97, 99.

In the embodiment shown, valve stem 20 is constructed for use within a three-way pressure balanced valve body 30. It should be appreciated, however, that alternative valve stems in accordance with the present invention may be constructed for use in alternative valve bodies. For example, valve stem 20 need not be used in a three-way pressure balanced valve system, and an alternative valve stem may include a single poppet sealing surface and a single dynamic sealing surface. In addition, although valve 20 is shown to be a mirror image about mains sections 34 and 44, it should be appreciated that alternative lengths and diameters may be employed if desired for a particular application.

Figure 2:
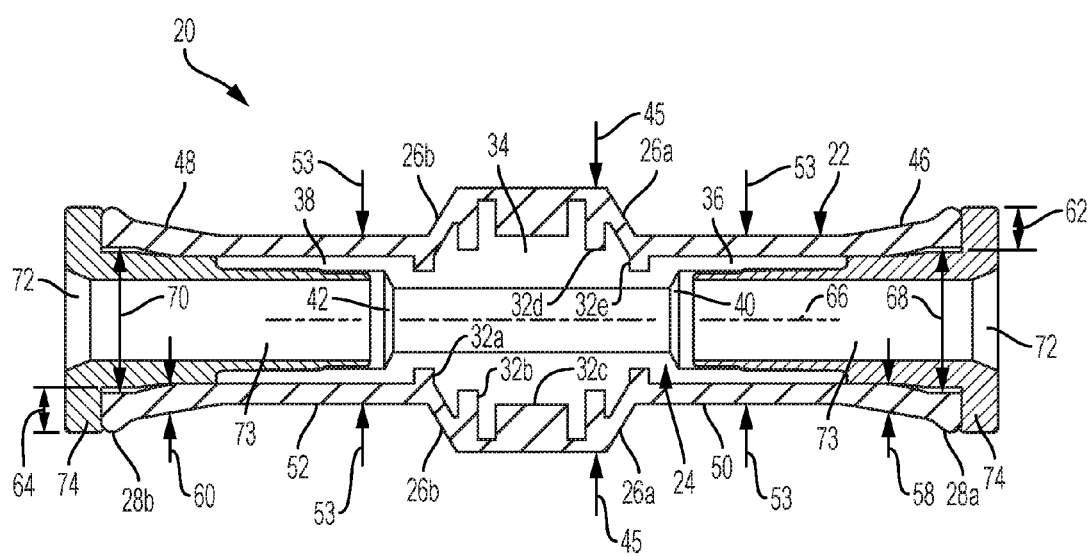
FIG. 2 is a cross-sectional side elevation view of the valve stem of FIG. 1.

As further shown in FIGS. 1-3, valve stem 20 may be provided with inserts 72 at either end that include a cylindrical wall or shaft 73 and radially outwardly extending seat portions 74 that contact the axial ends 47, 49 of exterior member 22. Inserts 72 are rigid or generally stiff members that are fitted into inner member 24 by pressing shafts 73 into the interior of arms 36, 38 to provide support to end sections 46, 48 of exterior member 22 during use, such as to inhibit end sections 46, 48 from collapsing. In particular, shafts 73 are inserted into openings 57, 59 of end sections 46, 48 and into cylindrical cavities 41, 43 (FIG. 4) of arms 36, 38. It should be appreciated, however, that in particular applications inserts 72 may not be required, such as, for example, in lower pressure applications. Still further, an alternative valve stem in accordance with the present invention may be specifically molded for use without requiring inserts. For example, the end sections of the exterior member may be molded to have a smaller internal diameter relative to inside diameters 68, 70 shown for exterior member 22. In such embodiments, the internal diameter of the end portions may be molded to be smaller than diameter 39. In particular embodiments, the internal diameters of the end portions may be generally conically formed, where the inner diameters are largest proximate ends 47, 49 and become progressively smaller as extending inwardly toward the inner member 24. The inner diameter material thickness of the exterior member being controlled to meet specific performance criteria.

Figure 5:
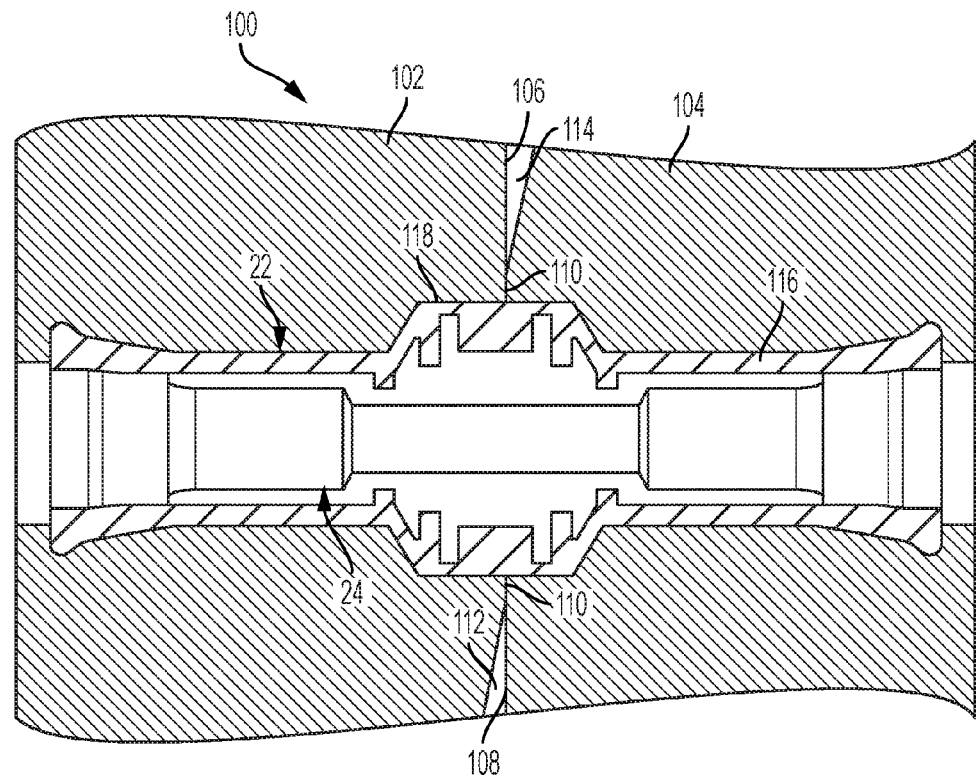
FIG. 5 is a cross-sectional side elevation view of the valve stem of FIG. 4 within a mold as used to mold the exterior covering over the inner member.

Referring now to FIG. 5, a mold 100 is shown for use in molding exterior member 22 about inner member 24. Mold 100 is constructed as a stacked mold having a first mold component or part 102 and a second mold component or part 104. Mold part 102 includes a contacting surface 106 that engages with a contacting surface 108 of mold part 104, where the mating of surfaces 106, 108 forms a mold parting line 110 of the mold 100. In addition, delivery channels 112, 114 in parts 102, 104, respectively, enable the material of exterior member 22 to be delivered into the cavity 116 to be molded about inner member 24. The fluid elastomeric material is thus axially molded about inner member 24. That is, the fluid elastomeric material is delivered about poppet section 34 of inner member 24 and simultaneously drawn or pulled axially toward both of the opposed ends of valve stem 20 to form end sections 46, 48.

Parting line 110 extends circumferentially about the surface 118 of poppet section 44 of valve stem 20. As such, any flashing or irregularity in the surface 118 resulting from the molding process extends circumferentially about section 44, thereby forming a circumferential or radial parting line about section 44. Of note, because the mold parts do not separate or join axially along the length of valve stem 20, any parting line or irregularity formed on exterior member 22 correspondingly does not extend axially along exterior member 22, and in particular does not extend axially across any of the sealing surfaces 26a, 26b, 28a, 28b. Such axial parting lines or irregularities on the rubber exterior of a valve stem could potentially create leak paths at the sealing surfaces when in use within a valve body, or may require subsequent processing, such as a grinding operation to remove any irregularities from the surface.

Accordingly, valve stem 20 formed by molding exterior member 22 with mold 100 provides sealing surfaces 26a, 26b, 28a, 28b of exterior member 22 that are substantially free of any parting line or irregularity resulting from a mold parting line. Exterior member 22, therefore, is well suited to be used without any additional processing steps and may provide near zero leakage at the sealing surfaces.

Although not shown, mold 100 may additionally employ mold inserts that are removably positioned adjacent arms 36, 38 during the molding process to provide support and define the interior surface of exterior member 22 extending beyond arms 36, 38, including the interior of end sections 46, 48. Still further, although mold 100 is disclosed as including two parts it should be appreciated that alternative molds may be constructed that employ additional parts, with such alternative molds still forming only radial parting lines that are not located at sealing surfaces.

Figure 6:
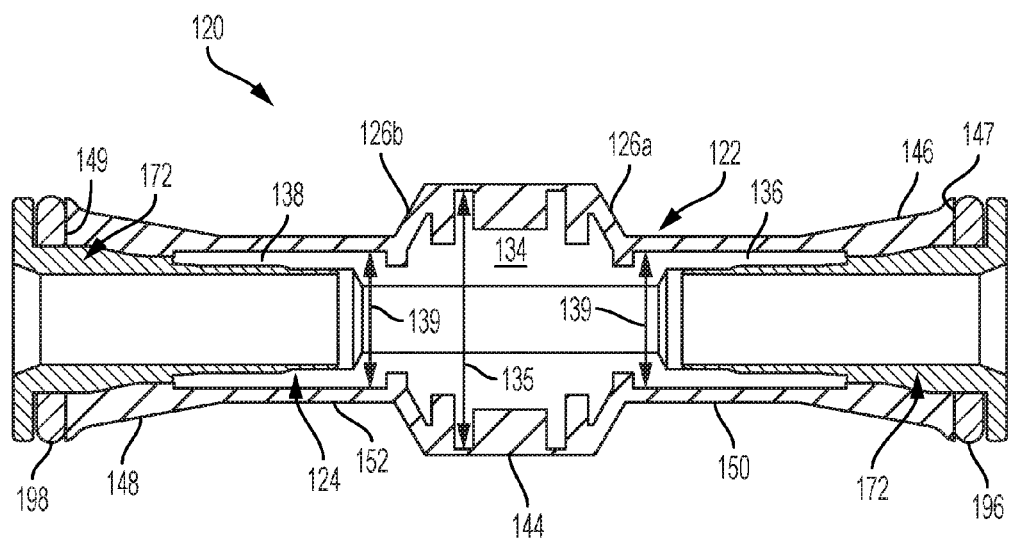
FIG. 6 is a cross-sectional side elevation view of an alternative valve stem in accordance with the present invention.

Referring now to FIG. 6, an alternative valve stem 120 constructed in accordance with the present invention is illustrated. Valve stem 120 shares similar features and components relative to valve stem 20, with the features and components of valve stem 120 being identified with 100 added to the reference numerals relative to the similar features and components of valve stem 20. Due to the similarities, not all of the features and components of valve stem 120 are discussed herein.

As shown in FIG. 6, valve stem 120 includes an exterior or covering member 122 molded about an inner member 124. Inner member 124 includes a main section or portion 134, as well as arms 136, 138 extending in opposed directions from main section 134, where arms 136, 138 receive inserts 172. As shown, main section 134 defines a diameter 135 that is larger than the diameters 139 of arms 136, 138. Covering member 122 includes a main, central or poppet section or portion 144 and end sections or portions 146, 148 that are spaced from section 144 by arm portions 150, 152, respectively, where end sections 146, 148 extend axially beyond the ends of arms 136, 138. Main section 144 includes sealing surfaces 126a, 126b. In the illustrated embodiment, end sections 146, 148 are slightly truncated relative to the end sections 46, 48 of valve stem 20 such that end sections 146, 148 do not include sealing surfaces.

Valve stem 120 further includes a pair of seal rings 196, 198 disposed over inserts 172 and located adjacent ends 147, 149 of end sections 146, 148. In the illustrated embodiment, seal rings 196, 198 comprise elliptical seal rings and are used to form dynamic seals within a valve body, such as within the bores 86, 88 of valve body 30. As shown, seal rings 196, 198 are disposed between ends 147, 149 of covering member 122 and seat portions 174 of inserts 172 such that end sections 146, 148 form or define a backing for seal rings 196, 198.

The valve stem in accordance with the present invention includes a unitary elastic cover having one or more sealing surfaces that engage with corresponding surfaces within a valve body to create seals. The sealing surfaces may define poppet seals and dynamic seals, such as for a three-way pressure balanced application. The end portions of the valve stem may be molded to include the dynamic sealing surfaces. The sealing surfaces of the elastic cover are formed to be free of parting lines, thereby providing improved sealing without requiring further operations on the sealing surfaces.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A valve assembly, said valve assembly comprising:
   a valve body, said valve body including a valve bore and a sealing edge;
   a valve stem disposed in said valve bore, said valve stem comprising an inner member having a main section and an arm extending from said main section, and an elastic cover molded over said inner member, said cover including a main cover portion, an arm cover portion, and an end portion, with said main cover portion disposed over said main section and with said end portion being spaced from said main cover portion beyond an end of said arm by said arm cover portion, said end portion defining an outer diameter that is greater than the outer diameter of said arm cover portion and said valve stem further including a seal member distally disposed from said main cover portion, said seal member defining an outer diameter that is greater than the outer diameter of said arm cover portion;
   said main cover portion including a sealing surface that operatively engages with said sealing edge to selectively form a seal, said arm cover portion being disposed over said arm of said inner member, and said seal member contacting said valve bore to form a seal there against, said end portion extending axially beyond said end of said arm with said end of said arm defining a distal end of said inner member and said end portion being unsupported by said inner member beyond said end of said arm whereby said end portion is radially inwardly collapsible.

2. The valve assembly of claim 1, wherein said main cover portion defines an outer diameter that is greater than the outer diameter of said arm cover portion.

3. The valve assembly of claim 1, wherein said end portion includes said seal member, and wherein said cover portion includes said main cover portion, said arm portion and said end portion and comprises a unitary single-piece elastic cover.

4. The valve assembly of claim 1, wherein said main section includes a diameter that is larger than a diameter defined by said arm.

5. The valve assembly of claim 1, wherein said valve stem further includes an insert comprising a shaft, and wherein said end portion of said cover includes an opening with said shaft being disposed in said opening and engaging with said arm of said inner member and supporting said end portion extending beyond said end of said arm.

6. The valve assembly of claim 5, wherein said insert includes a radially projecting seat portion adjacent said seal member.

7. The valve assembly of claim 6, wherein said seal member comprises a separate seal ring, with said main cover portion, said arm cover portion, and said end portion comprising a unitary member.

8. The valve assembly of claim 1, wherein said valve body includes a second sealing edge, and wherein said inner member of said valve stem includes a second arm extending from said main section in an axially opposed orientation relative to the other said arm, and wherein said cover includes a second arm portion and a second end portion with said second arm portion being disposed over said second arm and with said second end portion defining an outer diameter that is greater than the outer diameter of said second arm cover portion, and wherein said second end portion extends axially beyond an end of said second arm, with said end of said second arm defining a distal end of said inner member opposite said end of the other said arm, and wherein said second end portion is unsupported by said inner member beyond said end of said second arm whereby said second end portion is radially inwardly collapsible to facilitate removal of said over-molded valve stem when axially removed from a mold used to form said valve stem, said valve stem further including a second seal member distally disposed from said main cover portion opposite from the other said seal member;

said main cover portion including a second sealing surface that operatively engages with said second sealing edge to selectively form a seal, and said second seal member contacting said valve bore to form a seal there against.

9. The valve assembly of claim 8, wherein said end portion includes said seal member and said second end portion includes said second seal member, and wherein said cover portion includes said main cover portion, said arm portion, said end portion, said second arm portion, and said second end portion, and wherein said cover comprises a unitary single-piece elastic cover.

10. The valve assembly of claim 8, wherein said arm and said second arm each include a cavity, and wherein said valve assembly further includes a valve spring, said valve spring extending into a selected one of said cavities.

11. The valve assembly of claim 8, wherein said valve stem further includes a pair of inserts each of which comprise a shaft, and wherein said end portion and second end portion each include an opening with said shafts being disposed in respective ones of said openings and engaging with said arm and said second arm of said inner member and supporting said end portion and said second end portion, respectively.

12. The valve assembly of claim 11, wherein said inserts each include a radially projecting seat portion, and wherein said seal member and said second seal member each comprise a separate seal ring disposed on respective ones of said inserts.

13. The valve assembly of claim 1, wherein said cover does not include an axially extending part line disposed over said sealing surface or said seal member.

14. The valve assembly of claim 1, wherein the diameter of said valve bore contacted by said seal member is approximately equal to the diameter of said sealing edge whereby said valve stem is pressure balanced when said sealing surface of said valve stem contacts said sealing edge in a closed position.

15. The valve assembly of claim 1, wherein said end portion is radially inwardly collapsible to facilitate removal of said over-molded valve stem when axially removed from a mold.

16. The valve assembly of claim 1, wherein said arm includes a cavity defining an opening in said end of said arm, with said cavity including a seat portion and configured to receive a spring.

17. An over-molded valve stem, said valve stem comprising:

an inner member having a main section and an arm extending from said main section;

an elastic cover molded over said inner member, said cover including a main cover portion, an arm cover portion, and an end portion, with said end portion being spaced from said main cover portion by said arm cover portion and said end portion defining an outer diameter that is greater than an outer diameter of said arm cover portion, said over-molded valve stem further including a seal member distally disposed from said main cover portion and defining an outer diameter that is greater than the outer diameter of said arm cover portion;

said main cover portion being disposed over said main section with said main cover portion including a sealing surface, said arm cover portion being disposed over said arm of said inner member, and said end portion extending axially beyond an end of said arm, wherein said end of said arm defines a distal end of said inner member and said end portion is unsupported by said inner member beyond said end of said arm whereby said end portion is radially inwardly collapsible.

18. The valve stem of claim 17, wherein said main cover portion defines an outer diameter that is larger than the outer diameter defined by said arm cover portion, and wherein said end portion includes said seal member, and wherein said cover includes said main cover portion, said arm cover portion and said end portion and comprises a unitary single-piece elastic cover.

19. The valve stem of claim 18, wherein said valve stem further includes an insert comprising a shaft, and wherein said end portion of said cover includes an opening with said shaft being disposed in said opening and engaging with said arm of said inner member and supporting said end portion extending beyond said end of said arm.

20. The valve stem of claim 17, wherein said inner member of said valve stem includes a second arm with said second arms extending from said main section in an axially opposed orientation relative to the other said arm, and wherein said cover includes a second arm portion and a second end portion with said second arm portion being disposed over said second arm and with said second end portion defining an outer diameter that is greater than the outer diameter of said second arm cover portion, and wherein said second end portion extends axially beyond an end of said second arm, with said end of said second arm defining a distal end of said inner member opposite said end of the other said arm, and wherein said second end portion is unsupported by said inner member beyond said end of said second arm whereby said second end portion is radially inwardly collapsible to facilitate removal of said over-molded valve stem when axially removed form a mold, said valve stem further including a second seal member distally disposed from said main cover portion opposite from the other said seal member, and said main cover portion including a second sealing surface.

21. The valve stem of claim 20, wherein said end portion includes said seal member and said second end portion includes said second seal member, and wherein said cover portion includes said main cover portion, said arm portion, said end portion, said second arm portion, and said second end portion, and wherein said cover comprises a unitary single-piece elastic cover.

22. The valve stem of claim 17, wherein said end portion is radially inwardly collapsible to facilitate removal of said over-molded valve stem when axially removed from a mold.

23. The valve stem of claim 17, wherein said arm includes a cavity defining an opening in said end of said arm, with said cavity including a seat portion and configured to receive a spring.

\* \* \* \* \*